United States Patent [19]
Cox et al.

[11] 4,311,054
[45] Jan. 19, 1982

[54] MASS FLOWMETER WITH SENSOR GAIN CONTROL

[75] Inventors: Bruce M. Cox, Duncan, Okla.; Morris D. Ho, Walnut Creek, Calif.

[73] Assignee: Halliburton Company, Duncan, Okla.

[21] Appl. No.: 125,414

[22] Filed: Feb. 28, 1980

Related U.S. Application Data

[63] Continuation-in-part of Ser. No. 960,518, Nov. 13, 1978, Pat. No. 4,192,184.

[51] Int. Cl.³ .............................................. G01F 1/84
[52] U.S. Cl. ................................................ 73/861.38
[58] Field of Search .................... 73/861.38, 653, 655, 73/453, DIG. 11; 250/214 AG

[56] References Cited
U.S. PATENT DOCUMENTS

| | | | |
|---|---|---|---|
| 4,054,795 | 10/1977 | Kinder ........................ | 250/214 AG |
| 4,097,732 | 6/1978 | Krause et al. ............... | 250/214 AG |
| 4,127,028 | 11/1978 | Cox et al. ..................... | 73/861.38 |
| 4,252,028 | 2/1981 | Smith et al. ................. | 73/861.38 |

*Primary Examiner*—James J. Gill
*Attorney, Agent, or Firm*—John H. Tregoning; William J. Beard

[57] ABSTRACT

A mass flow rate meter is provided having two U-shaped tubular flow loops, means for vibrating the flow loops like the tines of a tuning fork. Opto-electrical sensors on opposite legs of the flow loops generate signals indicative of the times between the passing of the sides of the loop through the static plane of the loop. The times between the passing of the sides of the loops through the static plane may be combined to derive the mass flow rate of material flowing through the loops. Means are provided for varying the gain of the opto-electrical sensors to provide for a constant performance under conditions of changing temperature, voltage variations and aging characteristics.

11 Claims, 9 Drawing Figures

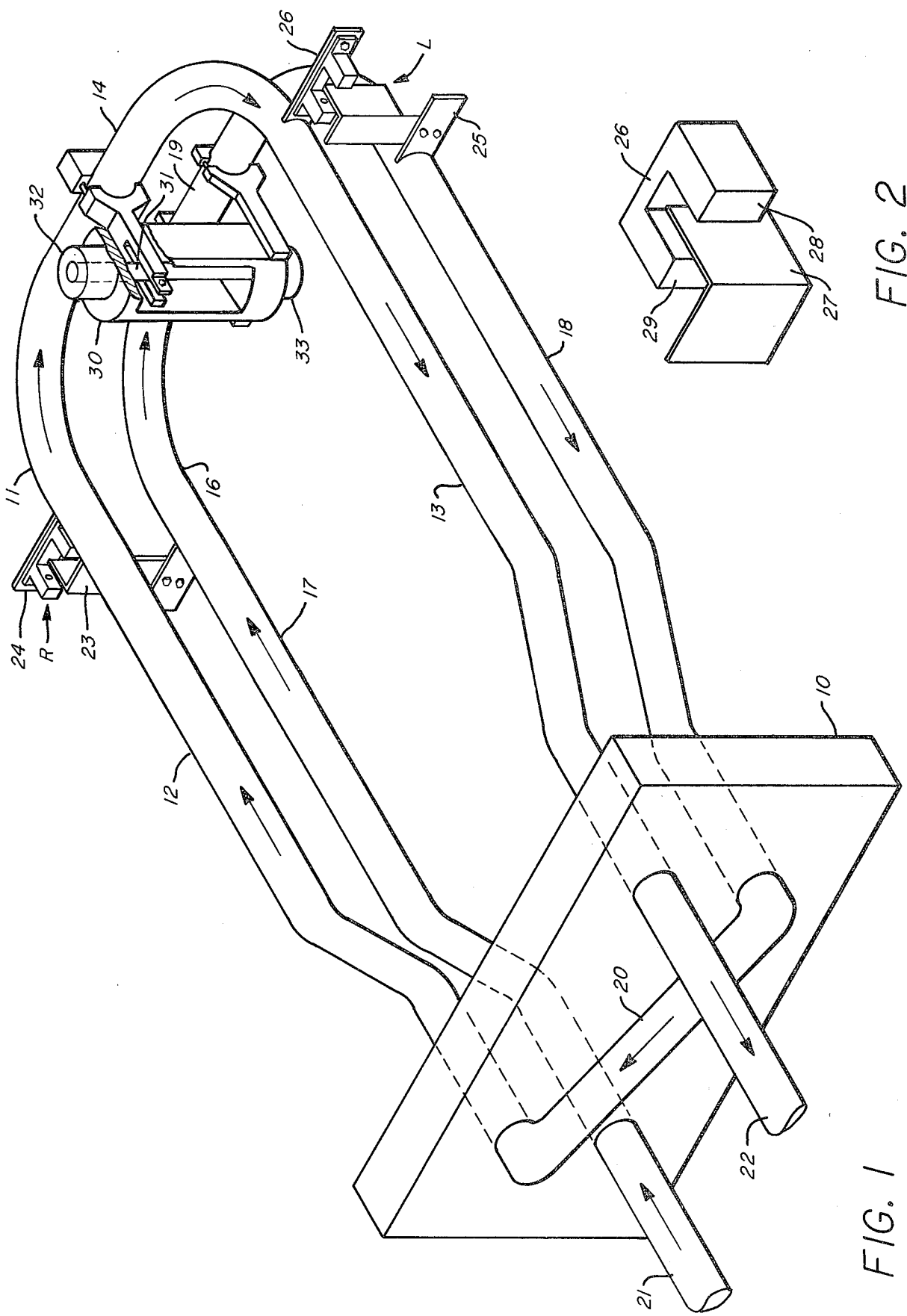

MASS FLOWMETER WITH SENSOR GAIN CONTROL

BACKGROUND AND SUMMARY OF THE INVENTION

This application is a continuation-in-part of copending application Ser. No. 960,518 filed Nov. 13, 1978 and assigned to the assignee of the present invention, now U.S. Pat. No. 4,192,184.

This invention relates to a system for measuring the mass flow of liquid, gas, solid material or combinations thereof wherein coriolis force is utilized as indication of the mass flow. The flowmeter includes U-shaped tubes which are vibrated while material to be measured flows through the tubes. Means are included to measure the mass flow of the material flowing through the tubes responsive to the vibrating characteristic of the tubes as altered by coriolis forces. The prior art related to the present invention is summarized in the aforementioned copending application. Briefly, U.S. Pat. No. 2,865,201 to Roth, U.S. Pat. No. 3,355,944 to Sipin and the flowmeter developed by Micro Motion, Inc. of Bouler, Colo. and described at page 21 of the Dec. 19, 1977 volume of Chemical and Engineering News, comprise the most pertinent art known to the applicants.

The coriolis flowmeter of the present invention includes sensing means connected to two vibrating U-shaped tubes for sensing which side of the U-shaped tubes cross a static plane first and timing means for timing the interval between the sides of the U-shaped tubes passing through the static plane. The time intervals of successive half cycles of vibration are then combined based on which side of the tube crossed the static plane first as determined by the aforementioned sensing means.

The present invention includes a sensor gain control or SGC circuit to maintain approximately constant output from the components of the sensors of the aforementioned sensing means. This SGC action reduces the effects of differential temperature and other disturbances on the components of the sensing means. Disturbances such as the accumulation of dust or changing electrical characteristics of the sensor means due to aging can vary the output from the sensor components in a manner deliterious to the performance of the system. The improved apparatus of the present invention substantially eliminates such effects.

The apparatus of the present invention also includes peak velocity controlling means for altering the peak amplitude of the vibration of the U-shaped tubes. The present invention further includes proximity switching means within said sensing means for sensing when the sides of the tubes cross the static plane, and discriminator means for generating a pulse after the signal from the switching means reaches a predetermined level. This amplitude altering means, switching means and discriminator means provide that the generated pulses from the discriminator means occurs while the output of the switching means is linear and holds the peak velocity of the vibrating U-shaped tubes at a constant value during varying density of fluid for activating and switching at the same point of its operating characteristic curve.

BRIEF DESCRIPTION OF THE DRAWINGS

The present invention is best understood by the following detailed description thereof when taken in conjunction with the drawings appended hereto. The drawings include the following:

FIG. 1 is a three dimensional diagram of the flowmeter of the present invention showing two U-shaped tubes, electromagnetic vibrator means and sensor means.

FIG. 2 is a closeup illustration showing a preferred embodiment of the sensor means.

DESCRIPTION OF THE PREFERRED EMBODIMENTS

Figure 3:
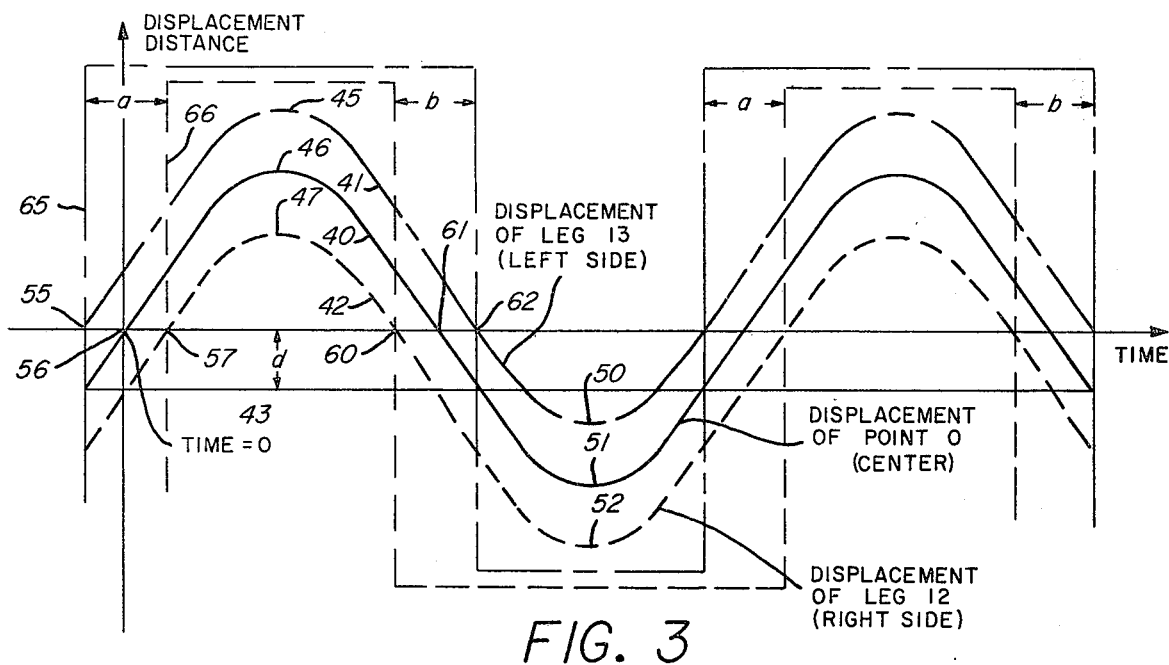
FIG. 3 is a diagram showing the displacement of the ends and the center of the cross member or bight portion of one of the U-shaped tubes as the U-shaped tube is vibrated wherein the U-shaped tube has an initial twist and the meter has no flow therethrough.

A three dimensional view of the mass flowmeter of the present invention is shown in FIG. 1. The mass flowmeter of the present invention comprises a base member 10 supporting an upper U-shaped tube 11 having side legs 12 and 13 and a cross member 14 which forms the bight end of the loop. The flowmeter further comprises a lower U-shaped tube 16 having side legs 17 and 18 and a cross member 19 forming the bight end of that loop.

A connecting flow tube 20 on the opposite side of base member 10 from the dual loops 11 and 16 provides cross flow from the outlet of lower loop 16 to the inlet of upper loop 11 through the base 10. A meter inlet 21 is provided through support 10 to the inlet of lower tube 16. A meter outlet 22 is provided through the support 10 to the outlet of the upper tube 11. The arrows in FIG. 1 indicate the direction of fluid flow through the dual loops of the system.

A right sensor means R is provided between the upper 11 and lower loop 16 on the righthand legs 12 and 17 facing the support member 10 from the bight ends 14 and 19 of loops 11 and 16. Right sensor R includes a flag 23 connected to the lower loop 16 and an interruptor module 24 connected to the upper loop 11. The interruptor module contains, on one side thereof, a light emitting diode (LED) and on the opposite thereof a photo transistor. The flag member 23, thus, upon vertical motion of the loops with respect to each other, interrupts the light path from the LED to photo transistor providing current wave shapes which will be discussed further in more detail.

A left sensor means L is provided on the left hand legs 13 and 18 between the upper loop 11 and the lower loop 16. Sensor means L includes a flag 25 connected to the lower loop 16 and an interruptor module 26 connected to the upper loop 11.

It will be appreciated by those skilled in the art that other types of position sensors could be used, if desired. For example, a Hall Effect device may be employed to sense tube position. A suitable Hall Effect device may be acquired from a number of sources, such as Ohio Semitronics Inc. of Columbus, Ohio.

At the middle of cross members 14 and 19 on the bight ends thereof are located vibrating means 30 for imparting up and down motion to the loops 11 and 16 generally normal to the plane of the loops. One of several vibrating means may be employed as desired. For instance, a magnetic pole piece 31 may be connected to the center point of one of the cross member 19 and a current winding 32 may be connected to the center point of the other cross member 14 for alternately attracting and repelling the magnetic pole piece 31 to cause the desired vertical vibrator motion.

Other means may be employed which would move the center points of the cross member 14 and 19 in one direction while relying on the stored energy in the loops for providing the motion in the opposite direction. Also included in vibrating means 30 is a velocity sense coil 33 which will be discussed in more detail later.

The inlet and outlet ends of loops 11 and 16 are firmly fixed in support member 10 such that the loops act as the tines of a tuning form which, when excited, assist each other by sympathetic vibrations, thus decreasing the power requirements of vibrating means 30 to maintain the loops in vibratory motion.

The design of the side legs 12, 13 and side 17, 18 is disclosed in U.S. Pat. No. 4,127,028 which is assigned to the assignee of the present invention. These forms are depicted in FIG. 1; however, the invention may also be used with a straight sided loop or loops, if desired.

FIG. 2 is a more detailed representation of the sensor means used for right sensor R and left sensor L. By way of example the lower blade portion 27 of flag 25 is shown in the interruptor module 26 of the left sensor L. Interruptor module 26 includes two projecting arm portions 28 and 29 which forms a saddle. Mounted on the opposite sides of the saddle are the previously mentioned LED and photo transistor. The blade portion 27 is aligned to fit between the arms 28 and 29 and to move freely up and down without touching the interruptor module body 26. When the blade portion 27 is fully inserted in the saddle between arms 28 and 29 the light beam from the LED is interrupted to turn the interruptor module to, for instance, the off position. When the blade 27 is sufficiently removed from between the saddle formed by arms 28 and 29, the LED light beam again strikes the photo transistor, allowing current to flow. Thus, the sensor means is used as a position sensor which changes from the off to on position as the blade portion 27 uncovers the phototransistor. Interruptor modules such as that just described may be acquired from a number of sources. For example, General Electric Company provides such an interruptor module under the designation H-13A1.

Figure 4:
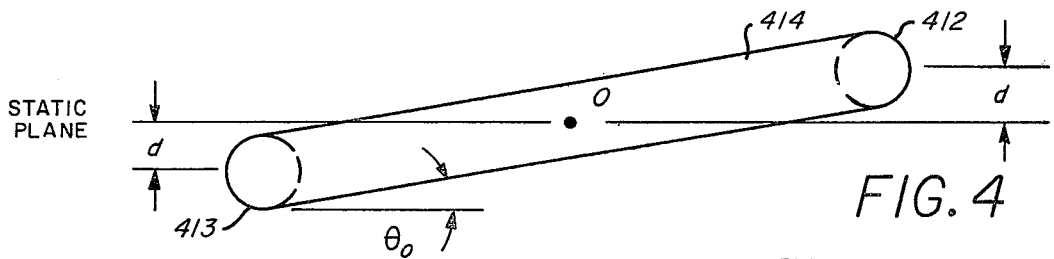
FIG. 4 shows the cross member or bight portion of the loop of FIG. 3 at its highest point of excursion due to the vibrator means.

FIG. 3 illustrates the waveforms of displacement of the cross member form 14 of upper loop 11 for three different points along the bight end of the loop. A similar set of waveforms may be developed for lower loop 16. FIGS. 4, 5, 6, and 7 illustrate the orientation of cross member 14 as the upper loop bight end is vibrated between its uppermost excursion and its lowermost excursion. FIG. 4 illustrates cross member 414 and the connected side legs 412 and 413 when the cross member 414 is at the upper limit of its excursion. Since, in a practical device it is impractical to orient the cross member 414 so that it remains perfectly level, an initial twist has been illustrated at an exaggerated angle $\theta_o$ for clarity. This angle $\theta_o$ results in the left side of cross member 414 being lower than the center point zero when there is no flow through the tubes 11 and 16 as shown in FIG. 4.

It is possible in the preferred embodiment that the left and right flags could be aligned such that the sensors are in the center of their linear range at the rest position of the loop.

Figure 5:
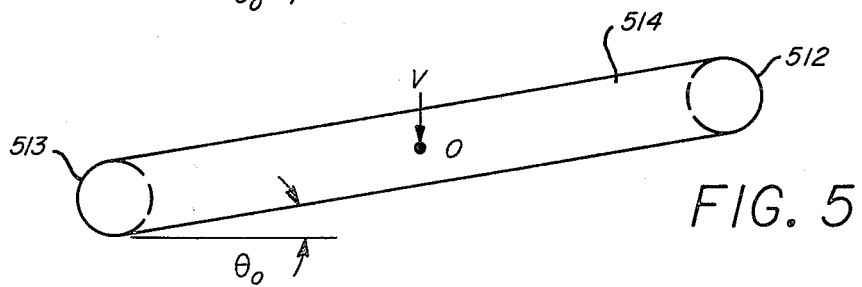
FIG. 5 shows a cross member of a U-shaped tube of FIG. 3 when the cross member is moving in the downward direction and just prior to the left end of the U-shaped tube crossing the static plane of the tube.

FIG. 5 illustrates the cross member 514 when it is moving downwardly and assumes that the left 513 is passing through the static plane of the tube 11. Thus, in FIG. 5 the left sensor L is at the instant when it is changing from the on condition to the off condition and the right sensor R is still in the on condition.

Figure 6:
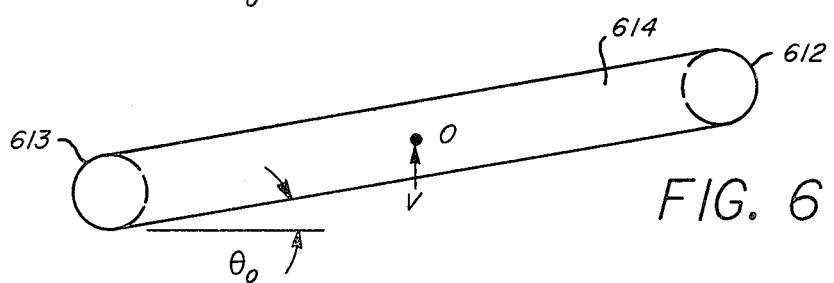
FIG. 6 shows the cross member of the U-shaped tube of FIG. 3 when the U-shaped tube is moving in the upward direction and just prior to the right end of the U-shaped tube crossing the static plane of the tube.

The cross member 614 in FIG. 6 is assumed to be moving in the upward direction and is shown at the instant that the right leg 12 is passing through the plane of the loop 11 when 11 is at rest. At the instant illustrated in FIG. 6, the right sensor R is being switched from the off condition to the on condition and the left sensor L is in the off condition.

Figure 7:
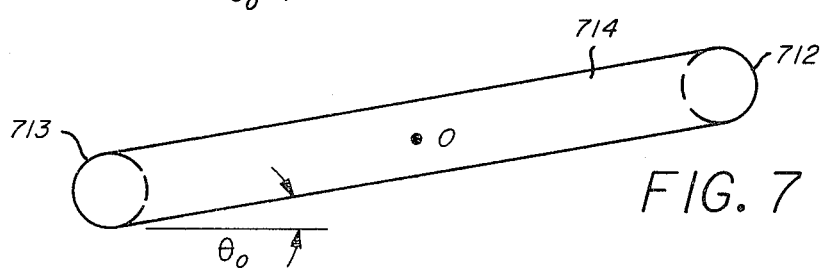
FIG. 7 shows the cross member or bight end of the U-shaped tube of FIG. 3 at its lowest point of excursion due to the vibrator means.

In FIG. 7 the cross member 714 is illustrated as it would appear at the lower most excursion of the vibrations of loop 11. At this instant, the loop is changing from a downward direction to and upward direction and at the lowermost limits of its excursion the tube is actually at zero velocity.

In all of the FIGS. 4, 5, 6 and 7 it is assumed that there is no flow of material through the loops 12 and 13. Thus there is no coriolis force acting on the tube to twist the cross member 14 about the center point zero and thus the cant angle $\theta_o$ of cross member 14 remains constant throughout the vibrations as shown in FIGS. 4, 5, 6 and 7. In FIG. 3 the offset distance from the static plane of loop 11 to center point zero caused by the oscillatory motion of center point zero is illustrated as a sine wave 40. The displacement of the end of cross member 14 where the cross member 14 joins the left leg 13 is illustrated in FIG. 3 as sine wave 41. Likewise, the displacement of point where cross member 14 joins right leg 12 is shown as a sine wave 42. The initial offset distance d with respect to the left side of cross member 14 caused by the right cant of cross member 14 is shown as a negative constant 43 in FIG. 3.

It can be seen that the motion of the left end of cross member 14 is the sum of sine wave 40 and the negative offset constant 43 shown as waveform 42 in FIG. 3. The motion of the right end of cross member 14 is initially offset by a similar distance from the right side of the cross member 14 to its center point 0 and may be seen in FIG. 3 to be equal to the difference between the sine wave 40 and the negative constant 43 and is shown as waveform 41 in FIG. 3.

When the cross member 14 is at the upper end of its excursion as shown in FIG. 4, the right end of cross member 14 will be at its highest peak shown at 45 of waveform 41. The center point 0 of cross member will be at its highest point shown at 46 of waveform 40 and the left end of cross member 14 will be at its highest peak shown at 47 of waveform 42.

When the cross member 14 is at the lower extremity of its excursions as shown in FIG. 7, the right end will be at its lowest point shown at 50 of waveform 41, the centerpoint 0 of cross member 14 will be at 51 and the left end of cross member 14 will be at 52. As can be seen, from FIGS. 3 and 4 and 7 when cross member 14 is at the upper limits of its excursion waveforms 40, 41 and 42 will be at the peaks of their positive cycles, and the right end will be at a higher peak at 45 than the left end which is at 47.

When the cross member 14 is at its lower excursion, waveforms 40, 41 and 42 will be at their negative peaks, and the left end will be at a lower position 52 than will be the right end which is at 50. When the cross member 14 is moving upwardly as shown in FIG. 6, the right end of cross member 14 will cross the zero axis first as shown at 55. Shortly afterwards, the center point zero will cross the static plane shown at the 0 axis and illustrated at 56. As the cross member 14 continues to move upwardly, the left end of the cross member will cross the zero axis last as illustrated at 57.

When the cross member 14 is moving downwardly as shown in FIG. 5, the left end will cross the 0 axis at 60 followed shortly by the center point 0 which crosses the axis 0 at 61 and then followed by the right end which crosses the 0 axis at 62.

When there is no flow through the flowmeter the time between points 55 and 57 designated as a in FIG. 3 will be equal to the time between points 60 and 62 designated as b in FIG. 3. The square wave 65 is shown at FIG. 3 showing the condition of the right sensor R. Right sensor R is in the on condition when the right side of cross member crosses the 0 axis in the positive direction and stays on until the right side of cross member cross the 0 axis at the end of its positive half cycle. R is then in the off condition where the right side of cross member 14 is in its negative half cycle. A square wave 66 likewise shows the condition of the left sensor L which is turned to the on condition when the left side of cross member 14 crosses the 0 axis. Left sensor L then stays on during the positive half cycle of the wave 47. L moves to the off condition at 60 when the left side of cross member 14 crosses the 0 axis and stays off while wave 42 is in its negative half cycle. Thus, the time "a" may be measured by observing the times between the arrival of the positive going edges of square wave 65 and 66 and the time "b" may be measured by observing the arrival of the negative going trailing edges of square waves 65 and 66. It will be observed that when there is no flow in loops 11 and 16 that time "a" will equal time "b."

As explained in the aforementioned copending patent application, Ser. No. 960,518 measurement of the time intervals a and b may be utilized in a coriolis flowmeter in accordance with the present invention to determine the mass flow of fluids traversing the loops of the system. Certain logic rules have been developed for the addition or subtraction of times a and b during the flow of fluid. However, these details will not be necessary to understand the operation of the present invention and hence reference is made to the foregoing patent application for a more complete description of this measurement process.

It will suffice to say herein that electronic systems are employed to measure the time intervals a and b and to apply logic to determine the mass flow rate based on these time measurements. An overall block diagram of an electronic system for performing these measurements is illustrated in FIG. 8.

Figure 8:
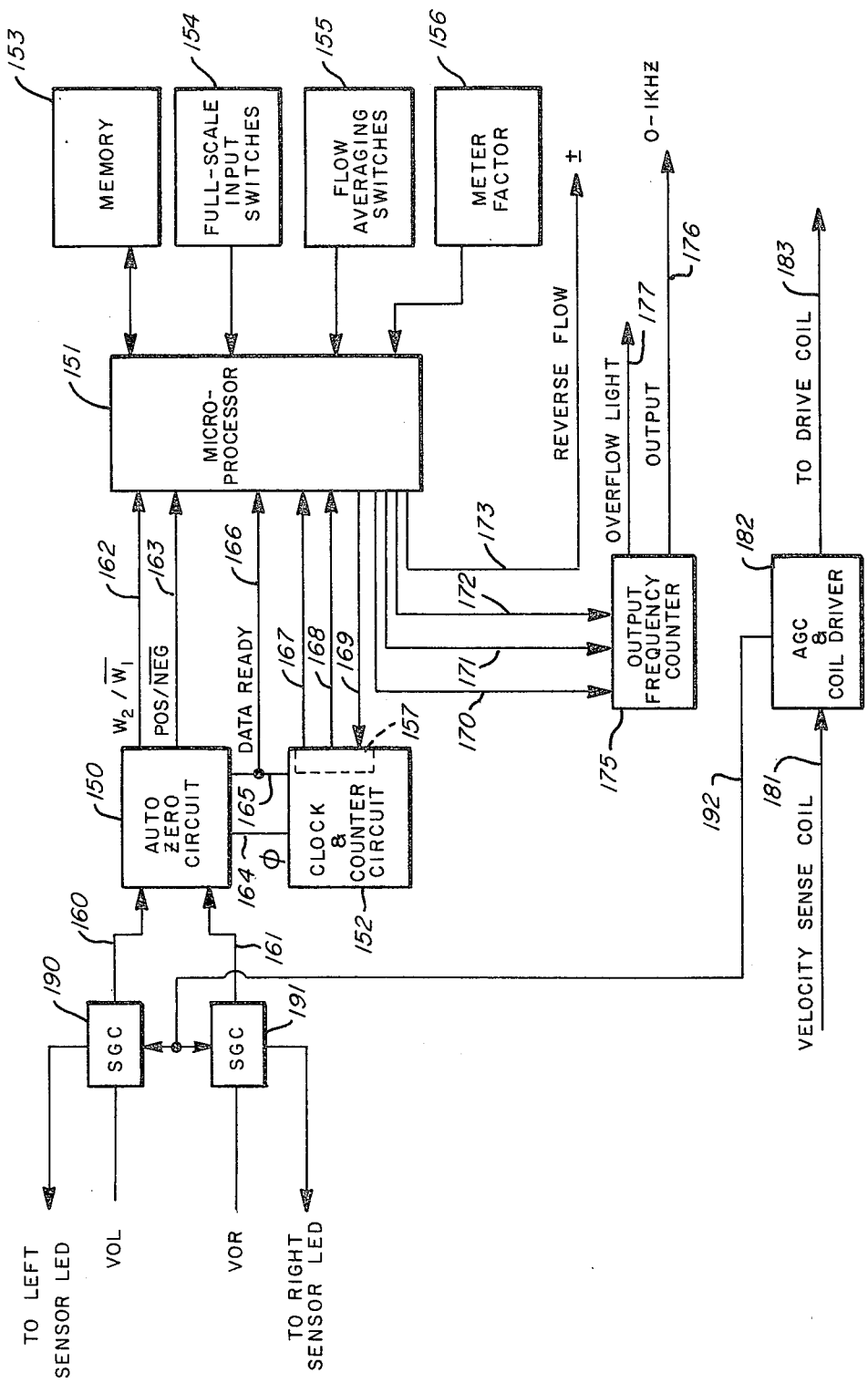
FIG. 8 is an overall schematic block diagram of the electronic system of the mass flowmeter of the present invention.

FIG. 8 is a schematic diagram of the electronics of the present invention and includes an auto zero circuit 150, a clock and counter circuit 152 and microprocessor 151, a memory 153, full scale input switches 154, flow averaging means 155, a meter factor input means 156. The electronic system also includes an output frequency counter 175 and an automatic gain control and coil driver circuit 182. Optical control system SGC circuits 190 and 191 are similarly included.

The voltage signal from the left sensor L is provided to the auto zero circuit 150 via the sensor gain control circuit 190 and line 160. Similarly, the voltage output signal from the right sensor R is provided to the auto zero circuit 150 via sensor gain control circuit 191 and conductor 161. Details of processing of these signals by the auto zero circuit, the microprocessor circuit, and the output circuits are disclosed with particularlity in the aforementioned copending application. The present invention concerns the improvement to the system of the addition of sensor gain control circuits 190 and 191, for controlling the light output of the sensor optics. The sensor gain control circuits 190, 191 and 182 of FIG. 8 are illustrated in more detail in FIG. 9.

It is apparent from a consideration of the precision of the measurements of the system of the present invention as described in the aforementioned copending patent application, that linear response of the optical components of the system is highly desirable. Variations in light output from the LED and phototransistor could lead to false detections of the zero axis crossing of the voltage signals from the optical sensors. Such optical variations can occur due to temperature variations, aging of electronic components, gathering of dust and voltage variations. Accordingly, in the present invention the addition of sensor gain control circuits 190 and 191 to control the optical output of the left and right sensor LEDS is incorporated. Operation of the coil driver automatic gain control circuit 182 has previously been described in the aforementioned copending patent application and is included in the block diagram of FIG. 9 generally for reference as it supplies a timing pulse to the optical sensor automatic gain control circuits 190 and 191 illustrated therein.

Figure 9:
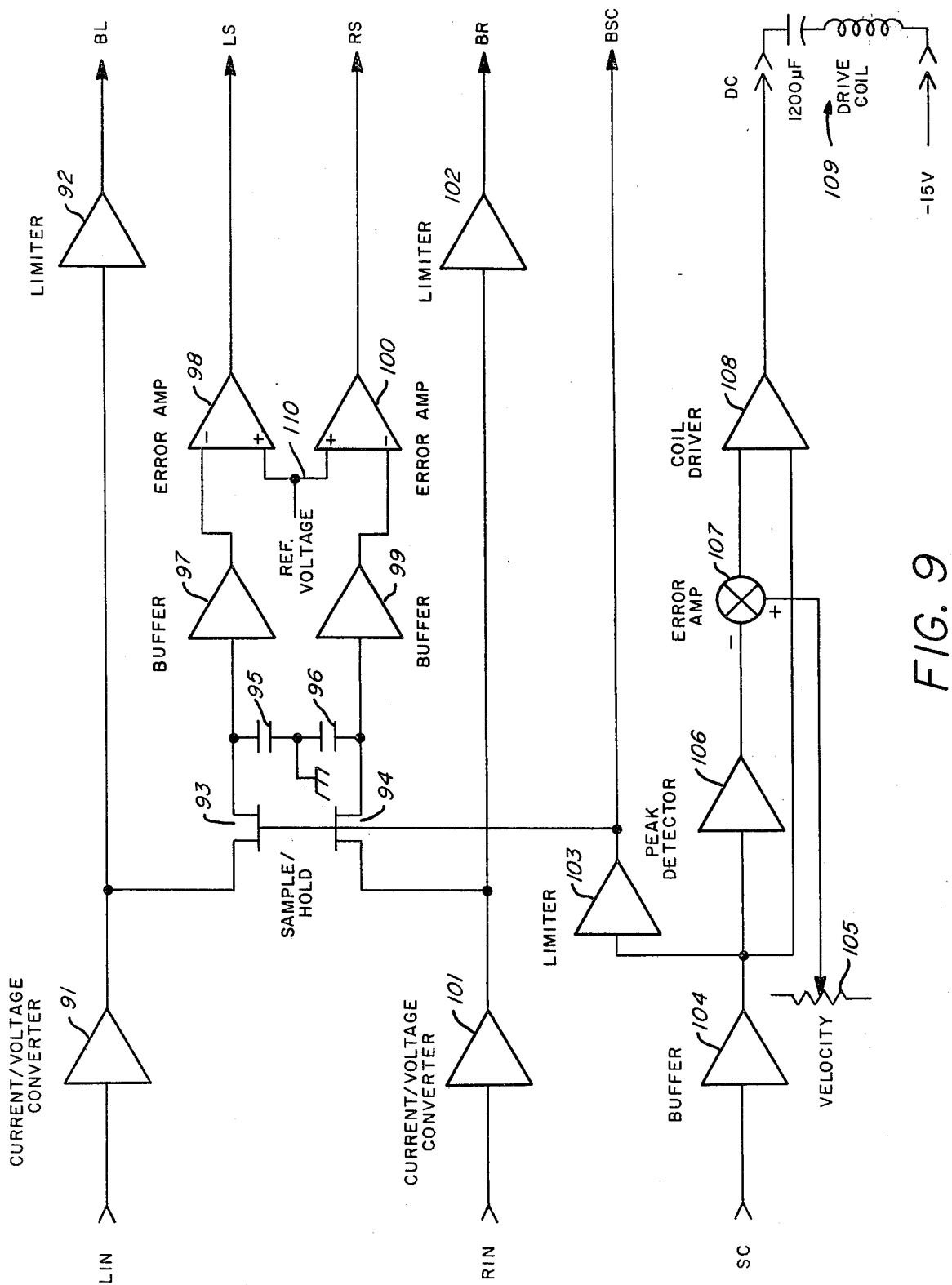
FIG. 9 is a schematic block diagram of a portion of the electronic system comprising the sensor gain control circuitry of the system of FIG. 8.

Referring now to FIG. 9, the gain control circuitry of the present invention comprises two matched channels for the left sensor and the right sensor. The left sensor processing channel comprises a current to voltage converter 91, a sample and hold circuit comprising transistor 93 and capcitor 95, a buffer amplifier 97, an error amplifier 98 and an output limiter amplifier 92. Similarly, the processing circuit for the right sensor gain control comprises a current to voltage converter 101, a sample and hold circuit comprising transistor 94 and capacitor 96, a buffer amplifier 99, an error amplifier 100, a reference voltage source 110 and an output limiter amplifier 102.

The flow loop velocity automatic gain control circuit compries, a buffer amplifier 104, a peak detector 106, an error amplifier 107, a coil driver amplifier 108, a reference velocity potentiometer 105 and the motion generating coil assembly 109. The velocity sense coil 33 provides a sinusoidal signal whose peaks occur at points of maximum velocity of the center of the bight ends flow loops. The frequency of this signal is used to control the frequency at which the loops are driven. This minimizes the power requirements of the drive source.

The two channels of the LED intensity circuit sensor gain controls circuits 190 and 191 of FIG. 8 maintain a constant peak to peak amplitude of the interruptor signals from the optical components of the system. Referring now to left channel processing circuit of FIG. 9, the input signal from the interruptor photo transistor emitter drives the current to voltage converter 91. The converter circuit 91 converts the current output of the photo transistor to a voltage output in a highly linear manner. The current to voltage converter 91 comprises an operational amplifier with appropriate feedback circuitry to accomplish this conversion. By using this configuration and since the emitter of the photo transistor drives a very low input impedance, the equivalent output capacitance of the photo transistor has very little effect on the bandwidth of the system. In fact, the bandwidth of the LED-photo transistor system is approximately 500 kilohertz.

The voltage output of current to voltage 91 converter is sampled at its peak value by the sample and hold circuit comprising transistor 93 and capacitor 95. Buffer amplifier 97 provides this peak sampling signal to an error amplifier 98 where it is compared with a reference voltage 110. A correction signal is derived by the error amplifier 98 which is supplied to drive the interruptor LED to maintain a constant intensity output. When operational this sensor gain control circuit maintains the peak to peak voltage of the output of the interruptor to within 0.1%. This SGC action reduces the effects of differential temperature and light path disturbances on the outputs. In addition, the voltage output of the current to voltage converter 91 is supplied to a limiter circuit 92 which further amplifies the signals and provides an output signal to the automatic zero circuit 150 of FIG. 8 via line 160 of FIG. 8.

Synchronization of the sampling by the sample and hold circuit comprising transistor 93 and capacitor 95 is supplied by utilizing a signal from the flow loop velocity automatic gain control circuit 182 of FIG. 8. The output of the current to voltage converter is sensed at the negative going zero crossing of the velocity sense coil 33 of FIG. 1 signal which is detected by a buffer amplifier 104 and limiter 103. This signal is supplied to the two sample and hold circuits comprising transistors 93 and 94 and capacitors 95 and 96 in the optical system gain control circuit. This action assures consistent sampling of the output of current to voltage converters 91 and 101 in the optical components gain control circuitry.

While only the left interruptor channel has been discussed in the foregoing description of the SGC circuitry, it will be appreciated that the right channel gain control circuit functions in an analogous manner to provide intensity control for the right channel optical components. This assures the generation of linear signals for application to the following logic circuitry which is utilized to determine the mass flow rate according to the concept of the invention.

It will be appreciated by those skilled in the art that changes and modifications may be made to the embodiments of the present invention described hereinbefore. It is the aim of the appended claims to cover all such changes and modifications as fall within the true spirit and scope of the invention.

We claim:

1. A mass flowmeter system of the coriolis force type, comprising:
    a base member;
    at least one generally U-shaped tube having two side legs joined together by a cross member, the free ends of said side legs being rigidly attached to said base member and forming an inlet and an outlet for flowable material;
    means for vibrating the bight end of said U-shaped tube perpendicular to the plane of said U-shaped tube;
    sensor means on each of the side legs of said U-shaped tube for generating an electrical output signal indicative of when each of said side legs reaches a predetermined point in its vibratory motion;
    third sensor means located approximately at the midpoint of said cross member for generating a control signal when said cross member reaches a predetermined point in its vibratory motion; and,
    means for automtically varying the electrical gain of said side leg sensor means to provide for consistent detection of when each of said side legs reaches the predetermined point in its vibratory motion, wherein said control signal is supplied to said gain varying means as the time basis for said gain varying means.

2. The system of claim 1 wherein said sensor means comprise opto electrical sensors having a light source, a light detector, means for converting detected light to electrical signals, and means for interrupting the light path from source to detector as a function of motion of said legs.

3. The system of claim 2 wherein said light sources comprise light emitting diodes and said light detectors comprise photo transistors.

4. The system of claim 3 wherein said means for automatically varying the electrical gain of said sensor means includes means for varying the drive current to said light emitting diodes.

5. The system of claim 4 wherein said means for varying the drive current to said light emitting diodes includes means for comparing said electrical output signals of said sensors to a reference signal and means for generating an error signal in response to said comparison.

6. The system of claim 1 wherein said predetermined point comprises the point of maximum positive displacement from its static position.

7. The system of claim 1 and further including means for sensing the velocity of said U-shaped tube and generating a signal representative thereof.

8. The system of claim 7 and further including means for detecting the peak velocity of said U-shaped tube in response to said representative signal, and generating a peak signal in response thereto.

9. The system of claim 8 and further including means for comparing said peak signal to a reference velocity signal and generating an error signal in response to said comparison.

10. The system of claim 9 and further including means responsive to said error signal for supplying current to said vibrating means.

11. The system of claim 10 wherein the frequency of said current supplied to said vibrating means is that of said representative signal from said velocity sensing means.

* * * * *